(12) United States Patent
Nazari et al.

(10) Patent No.: US 12,111,842 B2
(45) Date of Patent: Oct. 8, 2024

(54) LOW LATENCY COMMUNICATIONS FOR NODES IN REPLICATION RELATIONSHIPS

(71) Applicant: NVIDIA CORPORATION, Santa Clara, CA (US)

(72) Inventors: Siamak Nazari, Mountain View, CA (US); Jonathan A. McDowell, Belfast (GB); Nigel Kerr, Belfast (GB)

(73) Assignee: Nvidia Corporation, Santa Clara, CA (US)

( * ) Notice: Subject to any disclaimer, the term of this patent is extended or adjusted under 35 U.S.C. 154(b) by 302 days.

(21) Appl. No.: 17/695,068

(22) Filed: Mar. 15, 2022

(65) Prior Publication Data
US 2022/0292108 A1    Sep. 15, 2022

Related U.S. Application Data

(60) Provisional application No. 63/161,054, filed on Mar. 15, 2021.

(51) Int. Cl.
*G06F 16/20* (2019.01)
*G06F 11/14* (2006.01)
*G06F 16/27* (2019.01)

(52) U.S. Cl.
CPC .......... *G06F 16/27* (2019.01); *G06F 11/1451* (2013.01); *G06F 11/1464* (2013.01); *G06F 2201/84* (2013.01)

(58) Field of Classification Search
None
See application file for complete search history.

(56) References Cited

U.S. PATENT DOCUMENTS

| | | | | |
|---|---|---|---|---|
| 6,163,855 A * | 12/2000 | Shrivastava | ........ | G06F 11/1443 709/208 |
| 7,996,360 B2 * | 8/2011 | Iyengar | ............... | G06F 16/2308 707/622 |
| 8,930,316 B2 * | 1/2015 | Lee | .......... | G06F 11/16 707/655 |
| 9,720,995 B1 * | 8/2017 | Schuchardt | .......... | G06F 16/955 |
| 2009/0327817 A1 * | 12/2009 | Iyengar | ............... | G06F 16/2308 714/48 |
| 2021/0240354 A1 * | 8/2021 | Shiraki | ................ | G06F 9/4843 |
| 2021/0250243 A1 * | 8/2021 | Yang | ..................... | H04W 40/32 |
| 2023/0239763 A1 * | 7/2023 | Wei | ....................... | H04W 36/38 370/331 |

\* cited by examiner

*Primary Examiner* — Belix M Ortiz Ditren
(74) *Attorney, Agent, or Firm* — Hogan Lovells US LLP

(57) ABSTRACT

An initiating node (C) in a storage platform (100) receives a modification request (312, 314) for changing an object (O). The initiating node (C), using system configuration information (127), identifies an owner node (A) and a backup node (B) for the object (O) and sends change data (324, 334) to the owner node (A) and the backup node (B). The owner node (A) modifies the object (O) with the data (324) from the initiating node (C) and sends an update request (352) that does not include the data (324) to the backup node (B). The backup node (B) modifies a backup object (O') with data (334) from the initiating node (C).

20 Claims, 3 Drawing Sheets

LOW LATENCY COMMUNICATIONS FOR NODES IN REPLICATION RELATIONSHIPS

BACKGROUND

A replication relationship may exist between two nodes in a cluster storage platform. A replication relationship exists in a storage platform, for example, when a first node (the owner) maintains a storage object such as a virtual volume and a second node (the backup) maintains a backup copy or replica of the storage object. In the replication relationship, the owner may handle all storage operations targeting the object. For example, the owner may track where data of an owned virtual volume is physically stored and may process all read and write requests from storage clients targeting the virtual volume. The backup similarly maintains a backup volume that replicates the primary virtual volume, so that the backup needs to change the backup copy of the object to replicate changes that the owner made to the object.

A storage platform, in general, may include many nodes and may serve many storage clients, and the storage platform may be configured to permit any storage client to access shared volumes that any node in the storage platform may own. For example, a storage client with a storage request, e.g., a read or write request, targeting a virtual volume may contact a convenient or assigned node, e.g., a server available to the storage client, in the storage platform, but the contacted node may not be the owner of the target virtual volume. If the contacted node is not the owner of the target volume, the contacted node needs to communicate to the owner of the virtual volume the storage request, which may include data to be stored in the virtual volume. If the target volume is in a replication relationship, the owner of the virtual volume may then send any data changes in the virtual volume to the backup for replication.

An enterprise class storage system that maintains a large network of storage nodes may maintain an even larger number of replication relationships. In such platforms, efficient low latency communications between nodes are important both to improve network and storage platform performance and to reduce chances of a node failing while communications are in transit.

BRIEF DESCRIPTION OF THE DRAWINGS

The drawings illustrate examples for the purpose of explanation and are not of the invention itself. Use of the same reference symbols in different figures indicates similar or identical items.

DETAILED DESCRIPTION

In accordance with an example of the present disclosure, the size of transmissions that an owner node must send to a backup node in a storage platform can be reduced by having an initiating node in the storage platform send service requests or change data to both the owner and backup nodes. Latency of data transmission to the backup is effectively reduced because the initiating node can begin transmitting a service request or change data to the backup node before transmission of the service request to the owner node is complete or before the owner node begins processing the service request, thereby reducing the time between completion of the owner's portion of the service request and completion the replication portion of the service request. Otherwise, if the owner were required to send the data to the backup, the owner cannot do so at least until the owner has sufficiently received and processed the service request to understand the need to forward data to the backup. If the initiating node performs both a transfer to the owner and a transfer to the backup, the initiating node can transmit data in parallel, in overlapping transmissions, or immediately sequential transmissions to the owner and the backup, and once the owner has sufficiently processed the service request, all owner needs to send to the backup is an update request because the backup may already have or may already be receiving the data needed for the replication operation. The update request does not need to contain change data and thus may be substantially smaller, which may further lower the total time required to process the service request.

Figure 1:
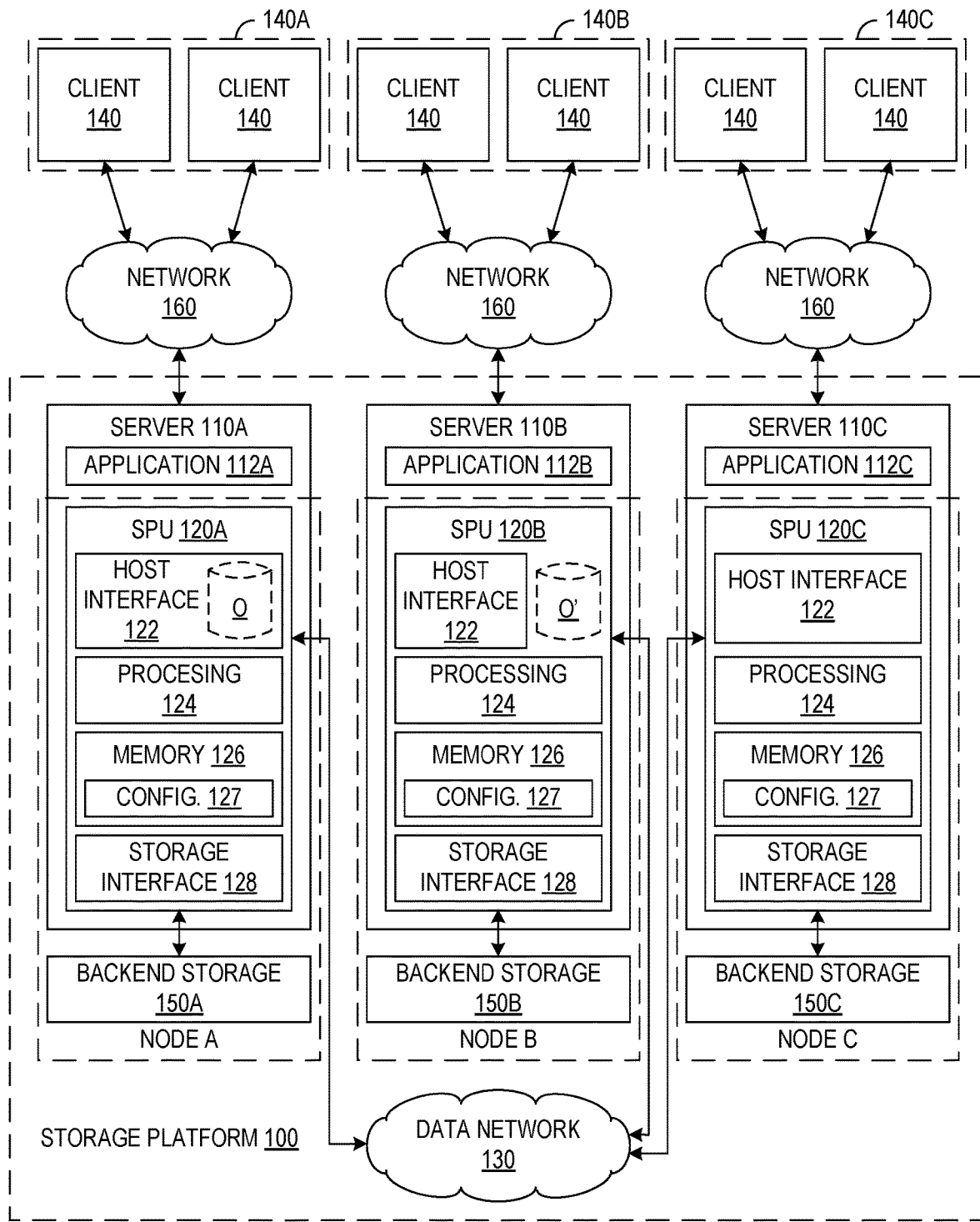
FIG. 1 is a block diagram illustrating a system including a cluster storage platform with multiple storage nodes in accordance with an example of the present disclosure.

FIG. 1 is a block diagram of a system including a storage platform 100 in accordance with an example of the present disclosure. Storage platform 100 employs multiple servers 110A, 110B, and 110C. Servers 110A, 110B, and 110C may be conventional computer systems that have installed service or storage processing units (SPUs) 120A, 120B, and 120C that control respective storage nodes A, B, and C of storage platform 100. (FIG. 1 shows a simple example with three nodes A, B, and C in storage platform 100, but more generally storage platform 100 may be a cluster storage system employing any number of storage nodes.) Each server 110A, 110B, or 110C connects to one or more networks 160, e.g., a private network of an enterprise or a public network such as the Internet, and servers 110A, 110B, and 110C may provide services to clients 140 that are connected to network 160. Each client 140 may, for example, be a conventional computer system that able to connect network 160 and execute programs that communicate with servers 110A, 110B, or 110C. In some cases, sets 140A, 140B, and 140C of clients 140 may be assigned to or may choose to communicate with associated servers 110A, 110B, and 100C.

Clients 140 may be storage clients. In some cases, each client 140 has storage needs, e.g., needs to store, retrieve, and share data or other information, and may send to a server 110A, 110B, or 100C a service request that requests storage services that storage platform 100 provides. In some other cases, servers 110A, 110B, and 110C execute applications 112A, 112B, and 112C, e.g., software or firmware such as database programs, that provide services to clients 140. For example, a client 140 needing a service that one or more applications 112A, 112B, and 112C provides may communicate a service request to the server 110A, 110B, or 100C running the application 112A, 112B, or 112C, and applications 112A, 112B, and 112C may then contact the resident SPU 120A, 120B, or 120C to request storage services needed to fulfil the request from a client 140.

SPUs 120A, 120B, and 120C control respective storage nodes A, B, and C in storage platform 100 as needed perform storage operations required in storage platform 100. SPUs 120A, 120B, and 120C in one specific example of the present disclosure are card devices, e.g., PCI cards, installed and resident in respective host servers 110A, 110B, and 110C. SPUs 120A, 120B, and 120C respectively control backend storage 150A, 150B, and 150C that store data of respective nodes A, B, and C. Each of backend storage 150A, 150B, and 150C may include one or more storage devices installed in a server 110A, 110B, or 110C or one or more external storage devices directly connected to an SPU 120A, 120B, or 120C. Backend storage 150A, 150B, and 150C may include, for example, hard disk drives, solid state drives, or other nonvolatile storage devices or media in which data may be physically stored, and each backend storage system 150A, 150B, or 150C may have a redundant array of independent disks (RAID) 5 or 6 configuration for performance and redundancy.

In the illustrated example, each SPU 120A, 120B, and 120C includes a host interface 122, a processing module 124, memory 126, and a storage interface 128. Host interface module 122 of each SPU 120A, 120B, or 120C includes hardware configured for communication with the host server 110A, 110B, or 110B in which the SPU 120A, 120B, or 120C is resident. Each processing module 124 is configured to perform storage operations or other services that the SPU 120A, 120B, or 120C provides. Memory 126 may include volatile and non-volatile memory that processing module 124 may use, for example, to store metadata, lookup tables, or databases for identifying: characteristics of virtual volumes. For example, platform configuration information 127 stored in memory 126 of each SPU 120A, 120B, or 120C may identify: all volumes or all shared volumes in storage platform 100; the owners of the shared volumes; any backups for virtual volumes; and where data for owned virtual volumes are physically stored in backend storage 150A, 150B, or 150C. Storage interface modules 128 include hardware configured for control of backend storage 150A, 150B, or 150C in which data owned volumes and maintained backup volumes may be physically stored.

Storage platform 100 presents virtual volumes to storage clients, so that storage clients may request storage services, e.g., read or write requests, targeting the virtual volumes. As a result, storage clients do not require any knowledge of backend storage 150A, 150B, or 150C. FIG. 1 illustrates an example in which an SPU 120A (and therefore node A) owns a virtual volume or storage object O, and host interface 122 of SPU 120A presents storage object O for service requests from clients. SPU 120B maintains in node B a backup storage object O' to replicate storage object O in node A. Accordingly, nodes A and B are sometimes referred to herein as being in a replication relationship for storage object O. The replication relationship between nodes A and B for storage object O allows node B to take over service requests targeting storage object O if node A becomes unavailable. While only one storage object O is shown for simplicity in the example of FIG. 1, each node A, B, and C may own zero, one, or multiple primary virtual volumes or storage objects that some or all storage clients can access, and each primary virtual volume may (or may not) have a backup virtual volume maintained by one or more other nodes in storage platform 100.

Storage platform 100 is configured so that each node A, B, and C serves respective sets 140A, 140B, and 140C of clients 140 or respective applications 112A, 112B, or 112C. In general, client sets 140A, 140B, and 140C may overlap or may be discrete. In an example of the present disclosure, clients 140 in set 140C or server application 112C may only be able to directly access node C, but storage object O, which node A owns, may still be shared and accessible to client set 140C through node C. When node C receives an IO request targeting storage object O, node C uses platform configuration information 127 to identify that node A is the owner of shared storage object O. Node C may also use platform configuration information 127 to identify that node B maintains backup storage object O' of targeted storage object O. Each node A, B, and C may have copies of the same configuration information 127 that identifies the nodes that own the virtual volumes and the nodes that backup the virtual volumes, and configuration information 127 may be setup or updated when virtual volumes are created in storage platform 100.

Storage platform 100 further includes a data network 130 that is independent of client network 160 and that nodes A, B, and C use when communicating with each other, e.g., to provide storage services. Alternatively, the nodes of storage network 100 could communicate with each other through the same network or networks 160 that servers 110A, 110B, and 110C and clients 140 use.

Figure 2:
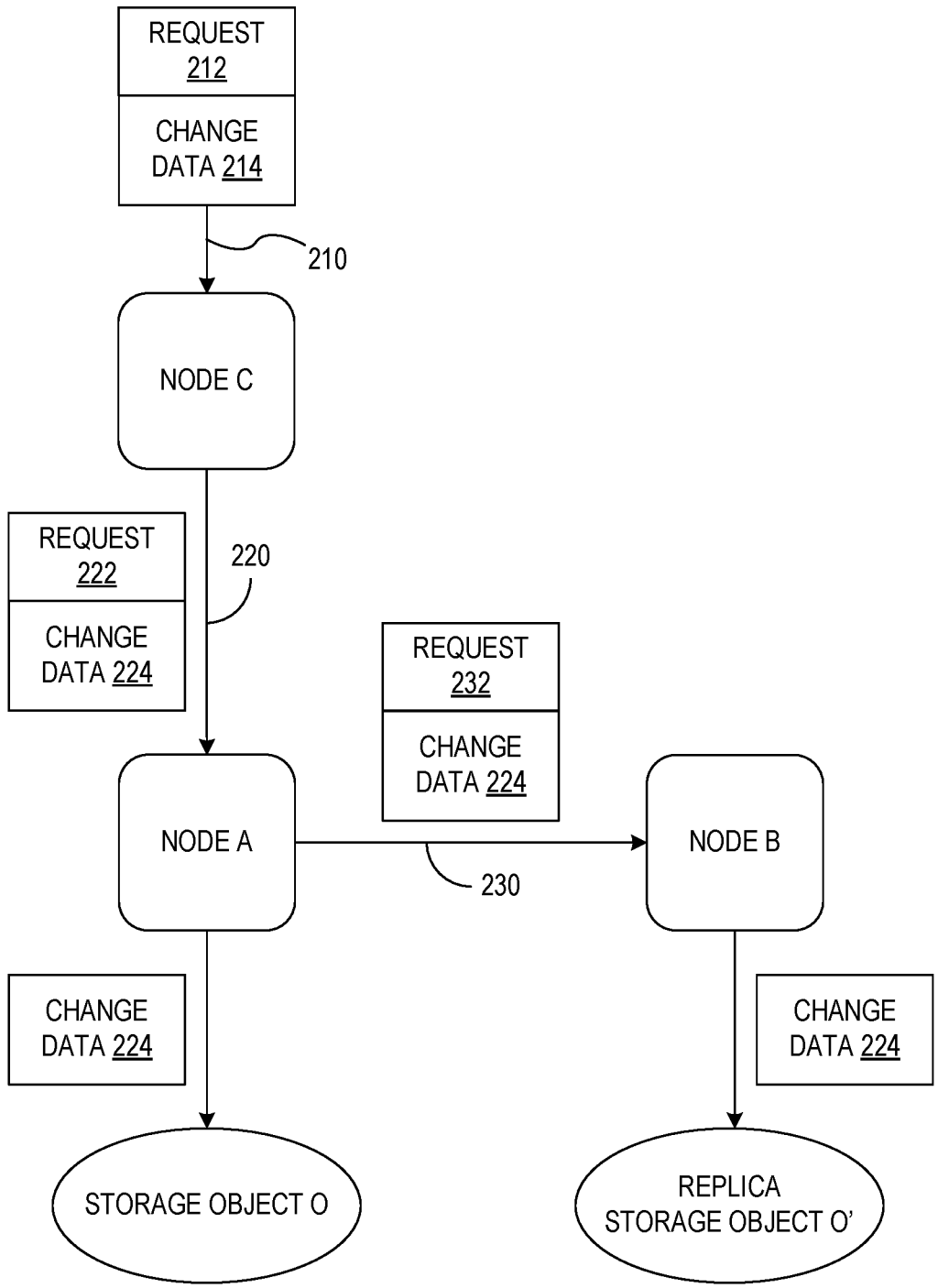
FIG. 2 illustrates data flows in an example of a storage operation including replication.

FIG. 2 illustrates an example data flow when a storage platform processes a service request targeting a storage object O owned by a node A and having a backup object O' that a node B maintains. For the data flow of FIG. 2, a replication relationship exists between owner node A and backup node B, such that node A owns storage object O, e.g., a virtual volume, which is replicated or backed up on node B. This means node B maintains storage object O', e.g., a backup volume, to be a full copy of storage object O, and when node A makes any changes to object O, node B needs to replicate the change in backup object O'.

In the data flow of FIG. 2, a modification request 212 with change data 214 for changing object O may be initiated by a device, e.g., a storage client, attached to a third node C of the storage platform, and a transmission 210 from the storage client provides to node C the modification request 212 with change data 214 targeting storage object O. Node C then identifies node A as the owner of the storage object O that the modification request 212 targets and sends a transmission 220 of a modification request 222 and associated change data 224 to node A, the identified owner of storage object O. Owner node A performs the storage operation identified in modification request 222 to store change data 224 in storage object O and sends a transmission 230 of a request 232 with change data 224 to backup node B, which stores change data 224 to update the replica copy O' of object O.

Completion of the replicated storage operation using the data flow of FIG. 2 takes time because owner node A can transmit change data 224 to backup node B only after owner node A has received change data 224 and processed request 222 sufficiently to identify that node B needs to replicate the modification on backup object O'. Change data 224 may be a relatively large data block, which causes transmission 220 and 230 to take time. The start and completion of the replication portion of the storage operation may therefore be delayed by times required for both transmissions 220 and 230, increasing latency for completion of storage operations. Some examples of the present disclosure may reduce the time or overhead involved in the replication relationship between nodes A and B. If an initiating node C is aware that a replication relationship exists between nodes A and B for object O, node C can send data of a modification request with change data to both nodes A and B. In particular, the initiating node C can send change data to both nodes A and B with respective metadata related to the service request and the roles of nodes A and B as owner and backup. As a result, backup node B may already have change data ready as soon as owner node A, and owner node A does not need to send the change data to backup node B with an update request.

Figure 3:
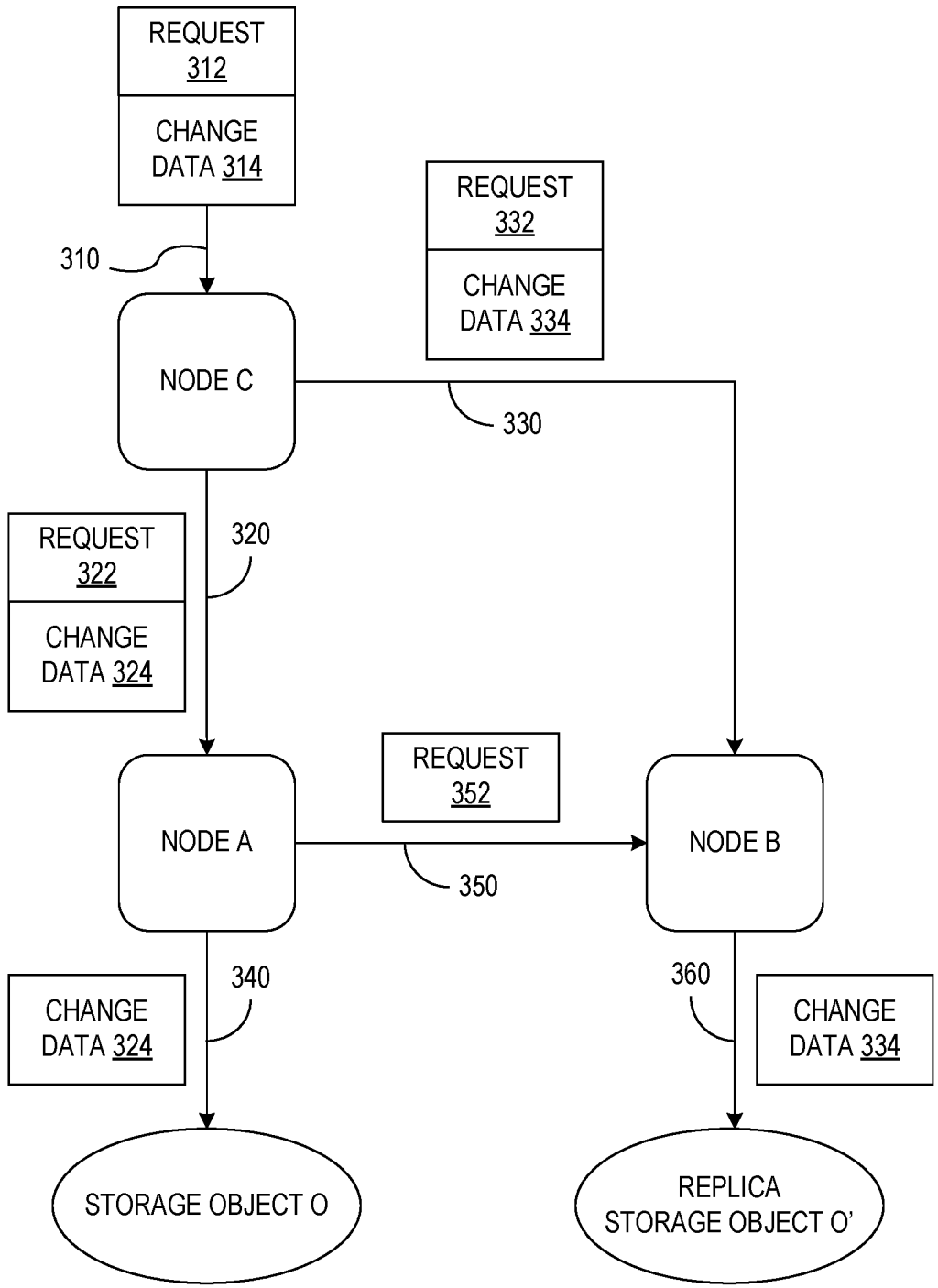
FIG. 3 illustrates data flows in an example of a storage operation in accordance with an example of the present disclosure where an initiating node sends change data to both an owner node and a backup node.

FIG. 3 shows an improved data flow when a node C receives a transmission 310 including a modification request 312 with change data 314 for a modification of an object O that node A owns and node B replicates. In one example, modification request 312 contains instructions or metadata, e.g., a header with values defined by a suitable syntax, that identifies a type of storage operation to be performed, e.g., a write operation, and identifies a target for the storage operation, e.g., a volume number and offset or address that identifies storage object O or a location within storage object O. Change data 314 may define the changes to be made. For example, change data 314 may be the new data to be written to the location identified in modification request 312. Node C receives a modification request 312 including change data 314 from an external source such as a storage client of node C. In the example of storage platform 100 of FIG. 1, SPU 120C, which is a storage component in node C, may receive modification request 312 and change data 314 from a client 140 in client set 140C or from an application 112C run by the server 110C in which SPU 120C resides.

Node C has configuration information for the storage platform and including data identifying the owner node A and backup node B for the target storage object O. For example, SPU 120C in FIG. 1 has configuration data 127 for storage platform 100. Initiating node C uses the configuration information to identify the owner node A for the target storage object O and to identify the backup node B that maintains replica storage object O'. Initiating node C then sends transmissions 320 and 330 respectively to the identified owner and backup nodes A and B. Transmission 320 includes a request 322 and change data 324. In one example, request 322 may be identical to modification request 312, and change data 324 may be identical to change data 314. Transmission 330 includes a request 332, which may be identical to modification request 312, and change data 334, which may be identical to change data 314. In some examples, request 322 or 332 may differ from modification request 312. For example, request 322 or 332 could identify the recipient as being the owner or the backup, provide information specific to the owner or backup, or indicate to the owner node A that change data 334 is being sent to backup node B. Change data 324 or 334 may also differ from change data 314. For example, change data 324 and 334 may be a compressed or encrypted version of change data 314.

Owner node A receives request 322 and change data 324 and performs appropriate processing of request 322. For example, owner node A may write change data 324 to storage object O. Upon determining that storage object O has or will be changed, owner node A in a transmission 350 to backup node B, sends only an update request 352. Update request 352 may instruct backup node B for replication of the change, but owner node A does not send change data to backup node B.

The metadata in requests 322, 332, and 352 may differ. For example, request 322 may provide owner node A with details of the volume or of the data relating to where the request originated, but backup node B may receive less metadata from initiating node C and may still receive some additional metadata in update request 352 from owner node A. In some implementations, update request 352 from owner node A may include a confirmation if backup node B should go ahead and process the request 332. This means when owner A has received the modification request 322 and performed any appropriate processing of the request 322, update request 352 from owner A only needs to include minimal update details that backup node B may need. This reduces the amount of data that needs to be transferred from node A to node B to complete the original request 312, reducing the total time needed for owner node A to return to initiating node C an acknowledgement that service request 312 has been completed.

Backup node B receives request 332 and change data 334 in transmission 330 from initiating node C and receives update request 352 in transmission 350 from owner node A. Node C may send transmission 330 to backup node B in parallel with transmission 320 to owner node A. Alternatively, transmissions 320 and 330 may overlap, be interwoven, or be sent in immediate succession. In each of these cases, backup node B is likely to receive all or part of change data 334 before owner node A sends update request 352 to backup node B. In response to update request 352, backup node B may modify replica storage O' with change data 334 that initiating node C provided to backup node B. Owner and backup nodes A and B may fully complete the storage operation with replication faster than in the process of FIG. 2 because backup node B is likely to receive change data 334 and update request 352 sooner than if both were sent from owner node A.

Systems and methods disclosed herein may reduce the time taken to process a request relating to a storage object that is in a replication relationship and therefore may improve the speed and efficiency of a storage platform. In contrast, previous approaches fail to capitalize on the knowledge an initiating node could have regarding replication relationships, meaning nodes in prior storage platforms can naively send the request only to the owner node, placing the entire burden of data transmission for replication upon the owner node. As disclosed herein, all nodes (or particularly the nodes that receive requests from storage clients) are fully aware of the replication relationships so that any node receiving a request can immediately send data to the owner node and the backup node to improve service times.

Each of the modules described herein may include, for example, hardware devices including electronic circuitry for implementing the functionality described herein. In addition, or as an alternative, each module may be partly or fully implemented by a processor executing instructions encoded on a machine-readable storage medium.

All or portions of some of the above-described systems and methods can be implemented in a computer-readable media, e.g., a non-transient media, such as an optical or magnetic disk, a memory card, or other solid state storage containing instructions that a computing device can execute to perform specific processes that are described herein. Such media may further be or be contained in a server or other device connected to a network such as the Internet that provides for the downloading of data and executable instructions.

Although specific implementations have been disclosed, these implementations are only examples and should not be taken as limitations. Various adaptations and combinations of features of the implementations disclosed are within the scope of the following claims.

What is claimed is:
1. A process comprising:
   receiving at a first node in a storage platform a service request that requests modification of a target storage object;
   the first node using configuration information to identify in the storage platform a second node that maintains the target storage object and a third node that maintains a backup storage object that replicates the target storage object;

transmitting data for the modification from the first node to both the second node and the third node;

the second node using the data from the first node to perform the modification of the target storage object;

the second node sending an update request to the third node, the update request not including the data; and the third node, in response to the update request from the second node, using the data the third node received from the first node to modify the backup storage object.

2. The process of claim 1, wherein the service request is from a source external to the storage platform.

3. The process of claim 2, wherein receiving the service request comprises a storage processing unit that is a component of the first node and is resident in a server receiving the service request from one of an application running on the server and a storage client connected to the server through a network.

4. The process of claim 1, wherein transmitting the data from the first node to the second node and the third node comprises transmitting the data over a data network that interconnects a plurality of nodes in the storage platform.

5. The process of claim 1, further comprising the first node transmitting to the third node metadata, the third node using the metadata and the data from the first node to modify the backup storage object.

6. The process of claim 1, further comprising the first node transmitting to the second node metadata that indicates that the first node is providing the data to the third node.

7. The process of claim 1, wherein:
the first node comprises a first storage processor resident in a first server;
the second node comprises a second storage processor in a second server and further comprises backend storage that the second storage processor operates to store data of the target storage object; and
the third node comprises a third storage processor in a third server and further comprises backend storage that the third storage processor operates to store data of the backup storage object.

8. The process of claim 7, receiving the service request at the first node comprises:
the first server receiving the service request from a client of the first server; and
the first server providing the service request to the first storage processor.

9. The process of claim 8, wherein the first storage process uses the configuration information to identify the second node and the third node.

10. The process of claim 1, wherein transmitting data for the modification from the first storage node to both the second node and the third node comprises transmitting the data through a dedicated network in the storage platform.

11. A system comprising:
a host interface configured to connect to a host server; and
a processing module configured to receive through the host interface a service request that requests modification of a target storage object in a storage platform and being configured to respond to the service request by performing a process comprising:
using configuration information for the storage platform to identify in the storage platform a first storage node that maintains the target storage object and a second storage node that maintains a backup storage object that replicates the target storage object; and
transmitting data for the modification from the first storage node to both the second node and the third node.

12. The system of claim 11, further comprising memory containing configuration information for a storage platform including the service processing unit in a storage node of the storage platform.

13. A storage platform, comprising:
at least one processor; and
memory storing instructions that, when executed by the at least one processor, cause the storage platform to:
receive, at a first node in the storage platform, a service request that requests modification of a target storage object, the first node using configuration information to identify in the storage platform a second node that maintains the target storage object and a third node that maintains a backup storage object that replicates the target storage object;
transmit data for the modification from the first node to both the second node and the third node, the second node using the data from the first node to perform the modification of the target storage object;
cause the second node to send an update request to the third node, the update request not including the data; and
in response to the update request from the second node, use the data the third node received from the first node to modify the backup storage object.

14. The storage platform of claim 13, wherein the service request is from a source external to the storage platform.

15. The storage platform of claim 14, wherein the instructions that, when executed by the at least one processor, further cause the storage platform to receive the service request comprises a storage processing unit that is a component of the first node and is resident in a server receiving the service request from one of an application running on the server and a storage client connected to the server through a network.

16. The storage platform of claim 13, wherein transmitting the data from the first node to the second node and the third node comprises transmitting the data over a data network that interconnects a plurality of nodes in the storage platform.

17. The storage platform of claim 13, further comprising the first node transmitting to the third node metadata, the third node using the metadata and the data from the first node to modify the backup storage object.

18. The storage platform of claim 13, wherein:
the first node comprises a first storage processor resident in a first server;
the second node comprises a second storage processor in a second server and further comprises backend storage that the second storage processor operates to store data of the target storage object; and
the third node comprises a third storage processor in a third server and further comprises backend storage that the third storage processor operates to store data of the backup storage object.

19. The storage platform of claim 18, wherein the first storage process uses the configuration information to identify the second node and the third node.

20. The storage platform of claim 13, wherein transmitting data for the modification from the first storage node to both the second node and the third node comprises transmitting the data through a dedicated network in the storage platform.

* * * * *